Nov. 8, 1938.    C. H. STOCKING    2,135,646
PROCESS FOR PRECOOKING FOOD PRODUCTS
Filed Nov. 21, 1936
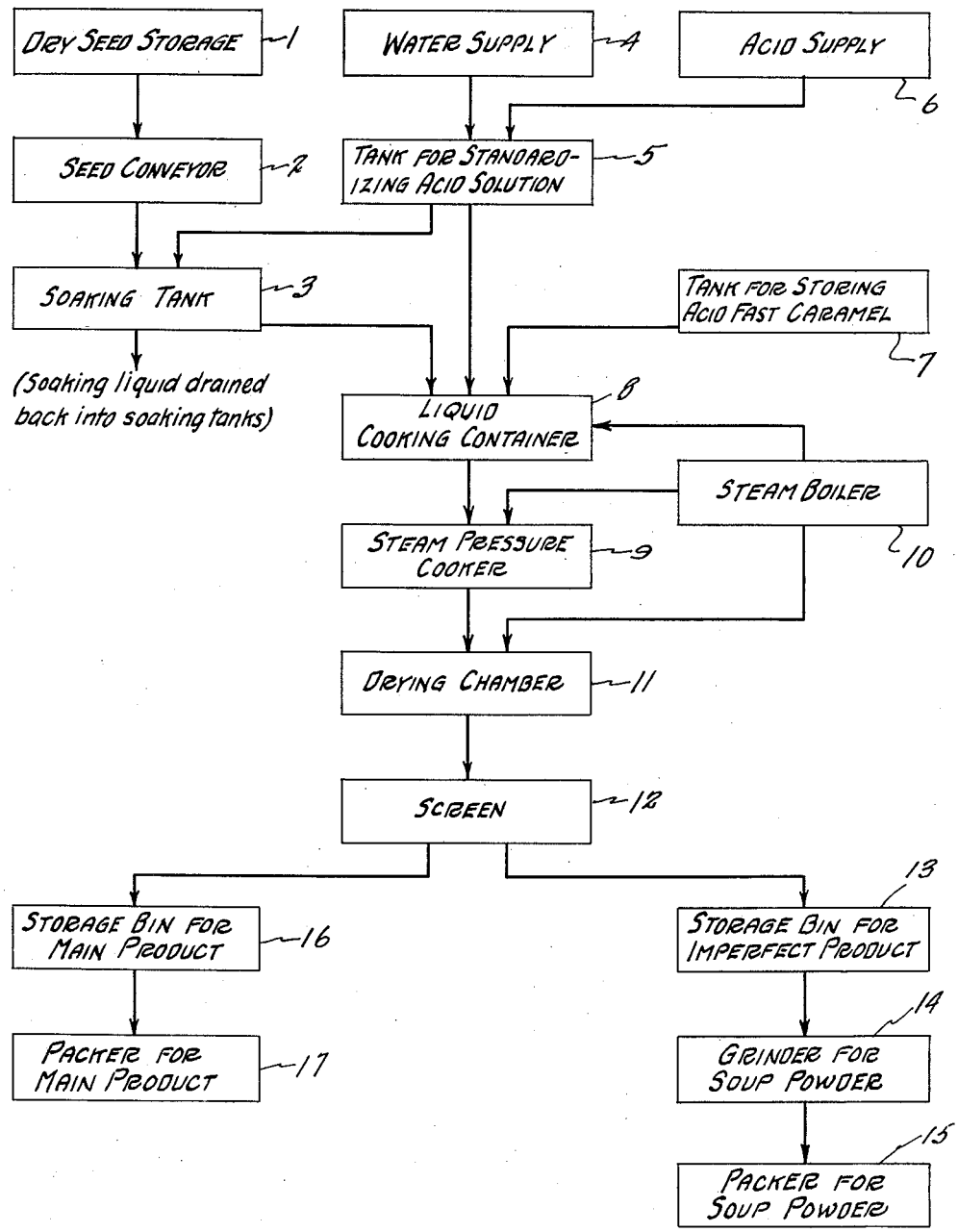
Inventor
CHARLES H. STOCKING
By Semmes & Semmes
Attorneys Patented Nov. 8, 1938

2,135,646

UNITED STATES PATENT OFFICE 2,135,646

PROCESS FOR PRECOOKING FOOD PRODUCTS

Charles H. Stocking, Ann Arbor, Mich.

Application November 21, 1936, Serial No. 112,121

6 Claims. (Cl. 99—98)

My invention relates to food products, and more particularly has reference to a process for precooking leguminous and similar seed products.

Precooked leguminous products prepared according to certain prior methods have certain undesirable features. The most important of these features are the shrivelled and cracked appearance, unappetizing color and taste, and lack of uniformity of the finished product. The existing processes precook the seeds entirely under steam pressure in a pressure cooker, and thereby eliminate the possibility of inspection of the various batches while being cooked. The ultimate result of such cooking is that it may be too long for certain seeds and, on the other hand, too short for others. Moreover, cooking solely by steam pressure tends to impart an unappetizing flavor to the seeds. It will be readily appreciated that the use of such processes often renders the product unfit for consumption, due to improper cooking.

Furthermore, it is not believed that any attempts have heretofore been made to prevent the cracking and shrivelling of the seeds in order to improve the outward appearance thereof.

One of the objects of my invention is to overcome the undesirable features of precooked leguminous products prepared according to the existing processes.

Another object of my invention is to provide a process for precooking leguminous and similar seed products in which these products can be inspected during the preliminary or water cooking phase of the process.

Still another object of my invention is to provide a process for precooking leguminous or similar seed products in which the length of time which shall be required for the steam cooking phase of the process can be more accurately determined.

Yet another object of my invention is to provide a process for the precooking of leguminous products which eliminates the possibilities of both under- and over-cooking by steam pressure.

A further object of my invention is to provide a process for precooking leguminous products in which a weak acetic acid solution is used to temporarily toughen the external coating of the products for the purpose of preventing the products from cracking during the cooking phase.

A still further object is to provide a process for precooking leguminous and similar seed products, in which an acid-fast caramel solution is used as a conditioning agent for the product.

Yet a further object of my invention is to provide a precooked leguminous or other seed product which can be easily prepared for table use in from 15 to 30 minutes' time.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have diagrammatically shown in the accompanying drawing the steps for carrying the same into practical effect without limiting the improvements in their useful applications to the particular procedure which, for the purpose of explanation, has been made the subject of illustration.

For the purpose of simplicity in description, I shall describe my process as applied to navy beans, it of course being understood that any other naturally occurring seeds can be prepared in a similar manner.

In carrying out my process, the raw dried beans are conveyed from a suitable storage bin I by means of a conveyor 2 to the soaking or macerating tanks 3. Water at room temperature is obtained from a suitable source of supply 4. The water is then piped by suitable means to the tank 5 where it is acidified with the proper quantity of acetic acid to provide an aqueous solution of the proper degree of concentration. I have found that a concentration of .1% to .5% of absolute acetic acid affords excellent results.

Ordinary tap or well water may be used for diluting the acid for preparing the soaking solution, if the water is pure and does not contain too high a percentage of iron and other solids. In the latter case, it should preferably be softened or distilled according to any conventional method.

A quantity of the weak acetic acid solution is piped to the soaking tanks 3. The solution should be of a sufficient amount to completely cover the beans and leave a layer of liquid above them even after the beans have swelled to their maximum size and have become substantially saturated with the soaking liquid.

The beans are left in the soaking tanks for a period of from 10 to 22 hours. This period of soaking at room temperature in the dilute acetic acid solution tends to soften the product so that it may be cooken more thoroughly. Furthermore, the effect of the dilute acid will temporarily toughen the outer coating of the bean so as to prevent any cracking thereof during the subsequent cooking process. After the soaking is completed, the beans are removed from the soaking liquid and are drained on suitable screens or the like.

After the beans have been removed from the soaking tanks, they are placed in a cooking apparatus 8. The beans are then covered with a cooking liquid consisting of a weak acetic acid solution to which is also added a very dilute solution of an acid-fast caramel solution as a conditioning agent. I prefer that the acetic acid solution be of the same concentration as that in which the beans were soaked.

The caramel solution is preferably stored in a tank 7 and may be conveyed to the cooking chamber in any suitable manner. I prefer that this caramel solution be prepared from dextrose. Other sugars, however, may be used in its preparation.

The use of acid-fast caramel in a very dilute solution serves to condition the beans so that they will possess a very acceptable physical appearance without excessive surface cracking. In addition, the caramel conditioning agent assures a stable color to the beans when they are subsequently cooked for consumption.

The beans are parboiled in the cooker 8 in the acetic acid and caramel solution for a period of from 20 to 60 minutes. It will be readily appreciated that the time of cooking will depend upon the age and condition of the beans. I prefer that these beans be cooked at a temperature below the boiling point of water. After the cooking step, the liquid is drained off from the beans.

The beans are then conveyed to a steam pressure cooker 9. They are processed under steam pressure in this cooker at from 5 to 14 pounds of steam pressure for a period of from 20 minutes to 2 hours. Steam pressure is supplied from the steam boiler 10 which may be of any desired construction.

The cooker in which the beans are parboiled may also be so constructed as to be used for pressure cooking by steam after the parboiling phase. In other words, the cooker may be a combined liquid and steam pressure apparatus. The parboiling is carried out with liquid in the apparatus. The apparatus is then drained and closed with a tightly fitting cover which is provided with a steam pressure gauge. Steam pressure is then applied until the cooking is complete.

It will be appreciated that the foregoing apparatus will avoid the necessity of transferring the beans from one vessel to another.

At the end of the steam cooking process, the beans are permitted to cool so that they may be removed from the cooker without materially altering their physical appearance.

I have found that, if the beans are removed from the cooker while still in a heated condition, they have a tendency to crack and pop open. The cooling process, however, prevents this condition from taking place. After the beans have cooled sufficiently, they are removed from the cooker to a suitable drying chamber 11. The beans are then dried in a highly humidified atmosphere at a dry bulb temperature of from 50° C. to 25° C. and a wet bulb temperature of from 47° C. to 22° C. The drying process is continued until the final moisture content of the beans is found to be less than 12% and the last traces of the acetic acid are completely vaporized from the beans.

After the drying is complete, the beans are removed to a suitable screening apparatus 12. The cracked and imperfect beans are conveyed to a storage bin 13 and thence to a suitable grinding apparatus 14 in which they are ground into powder, which may be used as a base in preparing soups and the like. This powder is then conveyed to a suitable packing apparatus 15 for sealing it in the necessary packages.

The whole beans are transferred from the screen 12 to the storage bin 16 for the precooked product. From this bin they are conveyed to the packing apparatus 17, where they are likewise sealed in suitable containers.

It will be readily appreciated from the foregoing description that the products prepared according to my process will possess an attractive appearance, have an appetizing flavor and high food value. Furthermore, the use of the weak acetic acid solution will toughen the external coating of the beans so as to prevent cracking or shrivelling of the coating during the cooking process. Finally, the food products can be prepared for table use in from 15 to 30 minutes' time, with an obvious saving of labor, time and fuel cost.

Moreover, the employment of my process obviates the possibility of over- or under-cooking the beans. Furthermore, the regulation of the steam pressure at lower levels than those now employed provides a finished product having a greatly improved flavor.

I claim:

1. A process for precooking leguminous food products which consists in soaking the products in a weak aqueous solution of acetic acid until the product becomes substantially saturated with the acid solution, removing the products from the solution, and parboiling the products in water to which has been added weak acetic acid and an acid-fast caramel solution.

2. A process for precooking leguminous food products which consists in soaking the products in an aqueous solution of acetic acid until the products become substantially saturated with the solution, removing the products, and parboiling the products in water to which has been added acetic acid and an acid-fast caramel solution the parboiling being conducted at a temperature below the boiling point of water.

3. A process for the preparation of precooked leguminous food products which consists in soaking the products in an aqueous solution of acetic acid of a .1% to .5% concentration of absolute acetic acid until the products become substantially saturated with the acid solution, removing the products from the solution, parboiling the products in water to which has been added weak acetic acid solution of the same concentration as the first solution and an acid-fast caramel solution at a temperature below the boiling point of water for a period of from 20 to 60 minutes, draining the solution from the products, and processing the products in live steam under a pressure of from 5 to 14 pounds for from 20 minutes to 2 hours.

4. A process for the preparation of precooked leguminous food products which consists in macerating the products in a weak aqueous solution of acetic acid, removing the products from the solution, parboiling the products in water to which has been added acetic acid and an acid-fast caramel solution for a period of from 20 to 60 minutes, draining off the liquid, and processing the product in live steam under pressure of from 5 to 15 pounds for a period of from 20 minutes to 2 hours.

5. A process for the preparation of precooked leguminous food products which consists in macerating the products in a weak aqueous solution of acetic acid, removing the products from the solution, parboiling in water to which has been added acetic acid and a weak acid-fast caramel solution for a period of from 20 to 60 minutes, draining off the liquid, and processing the products in live steam under pressure of from 5 to 15 pounds for a period of from 20 minutes to 2 hours, and subsequently sufficiently cooling the products.

6. A process for the preparation of precooked leguminous food products which consists in macerating the products in a weak aqueous solution of acetic acid, removing the products, parboiling the products in water to which has been added acetic acid and an acid-fast caramel solution, processing in live steam under pressure of from 5 to 15 pounds for a period of from 20 minutes to 2 hours, and subsequently drying the products in a highly humidified atmosphere at a dry bulb temperature of from 50° C. to 25° C. and at a wet bulb temperature of from 47° C. to 32° C. until the final moisture content of the product is less than 12%.

CHARLES H. STOCKING.